March 28, 1944. E. D. SMITH 2,345,507
PREPARATION OF CHLORINATED RUBBER
Filed Feb. 8, 1941
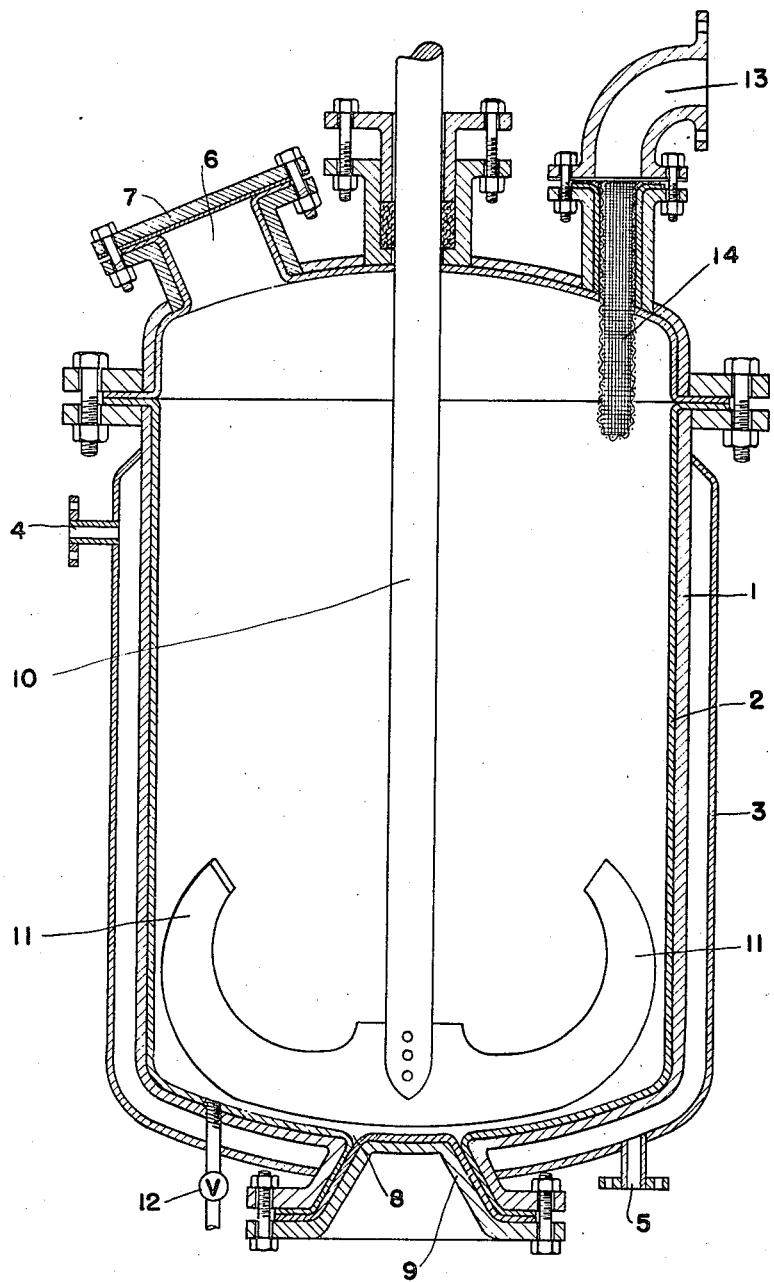
EARL DAVIS SMITH
INVENTOR.
BY Cleveland B. Hallabaugh Patented Mar. 28, 1944

2,345,507

UNITED STATES PATENT OFFICE 2,345,507

PREPARATION OF CHLORINATED RUBBER

Earl D. Smith, Blacksburg, Va., assignor to Hercules Powder Company, Wilmington, Del., a corporation of Delaware Application February 8, 1941, Serial No. 378,100

2 Claims. (Cl. 260—772)

This invention relates to an improvement in the preparation of chlorinated rubber and other chlorinated rubber-like materials with the purpose of producing material of improved appearance and stability. More particularly it relates to an improvement in drying such materials.

Chlorinated rubber has many valuable properties leading to its uses in highly resistant protective coating compositions. However, its value and its range of applicability are limited to some extent by its color, by its lack of complete clarity, by its tendency to discolor, especially when exposed to light, and by the occasional tendency to gel in solution.

It is an object of this invention to provide chlorinated rubber of improved color and clarity and of reduced tendency to discolor under the action of light and to gel in solution. It is an object to improve the method of preparing chlorinated rubber so as to bring about these improved properties in the product. Further objects will appear hereinafter.

The preparation of chlorinated rubber and other chlorinated rubber-like materials comprises subjecting a dispersion of a rubber-like unsaturated compound to the action of chlorine until the material ceases to be unsaturated, precipitating the resulting chlorinated product from its dispersion, and then drying the precipitated material to remove adherent liquids. It has now been found that the quality of the final product is seriously affected by the drying step, even though precipitated and washed chlorinated rubber is, to all appearances, stable and practically completed in preparation. It appears that wet chlorinated rubber precipitated from its chlorination dispersion is very sensitive to its surroundings and tends to pick up to some extent any metal with which it comes in contact. No practical metal of construction utilizable for drying equipment has been found over a long period of testing which does not impart its components to chlorinated rubber dried in contact therewith. However, it has now been found that in the case of one metal of many tested, a chlorinated rubber product of improved color, clarity, and stability is obtained.

The present invention by which the above objects are attained comprises, therefore, the improvement which consists in dying wet chlorinated rubber in contact with metal surfaces consisting essentially of nickel. Thus, the process to which this invention is directed comprises the formation of a more or less fluid dispersion of an unsaturated rubber-like material, chlorination of the rubber-like material in the dispersion until it has become saturated, or if desired until it is incapable of taking up further chlorine, precipitation of the chlorinated rubber-like material from its dispersion with a non-solvent for the product, and drying the wet precipitated chlorinated material in contact with a surface consisting essentially of nickel. The drying step is most siutably conducted by subjecting the wet precipitated material to heat or to a current of air or both while holding the material in a vessel whose surfaces in contact therewith consist essentially of substantially pure nickel. Preferably, the nickel surfaces in contact with the chlorinated rubber are maintained at an elevated temperature. Preferably also, the drying step is conducted at subatmospheric pressures.

The method in accordance with this invention applies to chlorinated products made from one of the natural rubbers, such as hevea rubber, balata, gutta percha and the like and it also applies to chlorinated products made from such synthetic rubber-like materials as polymerized chlorobutadiene, polymerized butadiene, rubber hydrochloride, butylene polymers and copolymers, especially with butadiene derivatives and the like which are unsaturated and capable of chlorination. The improvement of the present invention may be applied to chlorinated materials of the character mentioned which have been chlorinated to the point at which they have become saturated by addition of the chlorine, or to the point at which they are incapable of further reaction with chlorine either by addition or by substitution, or to some point intermediate between these two extremes. Thus, for example, it may be applied to the product obtained by chlorinating ordinary (hevea) rubber until it has a chlorine content of about 52%, or until the chlorine content has reached about 75%, or until it has reached an intermediate stage such as in the range between about 67 and about 72%, at which clorination is for practical purposes nearly complete.

In the process in which the improvement according to this invention finds its place, the rubber or rubber-like material is dissolved or dispersed to render it more or less fluid in a solvent or dispersing medium. Preferably, this medium is inert to chlorine, in which respect carbon tetrachloride is eminently suitable. However, such media as chloroform, tetrachlorethane, benzene, toluene, chlorinated toluene, chlorinated benzene, and the like may also be used. The dispersion is subjected to chlorine, preferably with agitation, at least until the rubber-like material becomes saturated, with or without the addition of air or oxygen to reduce the viscosity of the product. Upon completion of the chlorination step, the product is precipitated from its dispersion and removed from the dispersing medium. Residual chlorine, hydrochloric acid and the like are removed, for example, by washing. Precipitation may be carried out by adding any liquid non-solvent for the chlorinated material, and will usually be carried out by agitating the dispersion of chlorinated material with water, usually heated, or with a mixture of steam and water. However, other non-solvents such as hexane, heptane, ethyl alcohol, methyl alcohol, etc., may be used.

In a specific example of such a procedure 800 grams of milled crepe rubber are dissolved in 15,840 grams by weight of carbon tetrachloride in a jacketed, closed vessel provided with means for agitation and with suitable gas inlets and outlets. After solution is complete, chlorine gas is passed through the mass under agitation for about three hours at a rate starting at about 4 liters per minute and gradually decreasing to about ⅕ of a liter per minute. The addition of chlorine is then continued at a rate of about 1⅓ liters per minute with simultaneous addition of air at about 1 liter per minute for about two hours. Chlorination is then continued for three more hours at a rate varying between ⅓ and ½ liter per minute with only a slight accompanying flow of air. The chlorinated rubber so produced is then precipitated to form more or less porous granules by mixing the carbon tetrachloride solution with vigorously boiling water. The precipitated material is then thoroughly washed with water.

After the chlorinated rubber-like material has been precipitated and washed, it is dried in contact with surfaces consisting essentially of nickel, utilizing for example equipment such as shown by the drawing which presents a cross-sectional view of a suitable drier.

Referring now to the drawing, the drying vessel shown therein comprises a shell 1 with a lining 2 of substantially pure nickel. The vessel is equipped with a jacket 3 provided with a suitable inlet 4 and outlet 5 for steam or other heating fluid. The vessel is provided with an inlet 6 for the material to be dried provided with a suitable closure 7. It is similarly provided with an outlet 8 for the material to be dried provided with a closure 9. A suitably powered rotatable nickel shaft 10 to which are fixed nickel agitator arms 11 provides for tumbling or agitating material being dried in the vessel. The vessel is further provided with a valved air inlet 12 and an outlet 13 for removal of air and vapor fitted with a screen 14.

The wet precipitated chlorinated material is placed in the drying vessel and is tumbled or agitated by the agitator arms. Steam or other heating fluid is passed through the jacket of the vessel. Vapor formed by the drying process is removed through the vapor outlet. The outlet screen prevents loss of the chlorinated material. Preferably, the vessel is placed under a partial vacuum, whereby drying may be carried out at temperatures from 50° C. to 100° C. Vacuum drying leads to products of minimum color and high stability. It also speeds up removal of the vapor and shortens the entire drying operation. If desired, a current of air, preferably warmed, is passed through the drying vessel. This current may be utilized whether operation is carried out under a vacuum or whether it is carried out at ordinary atmospheric pressure, and may be supplied by cracking the valve of the air inlet while maintaining suction upon the outlet. It is highly desirable that a maximum portion of the surfaces of nickel in contact with the chlorinated rubber being dried be maintained at an elevated temperature to insure the best possible qualities in the product; temperatures between about 50° C. and about 130° C. are suitable.

The method in accordance with this invention results in products having less color, greater clarity, diminished tendency to discolor under the influence of light, and a reduced tendency to gel upon standing in solution. The improved results are not due to freedom from metallic pick-up, since it has been found that nickel is picked up by the drying chlorinated rubber just as are any components of all other known metals suitable for construction of the drier. For example, six lots of chlorinated rubber dried in contact with surfaces consisting of substantially pure nickel were found to have nickel contents which varied between 20 and 100 parts per million. Similarly prepared chlorinated rubber dried in equipment comprising in part iron contact surfaces had an iron content varying from 37 to 85 parts per million for seven batches. Thus, it will be seen that metallic pick-up was not eliminated or greatly reduced by the substantially complete substitution of nickel contact surfaces for iron. However, the material dried in contact with surfaces consisting of nickel had a color in 20% solutions in toluene varying from 8.5 to 12 on the Hazen color scale, whereas the solution color of the lots dried in the iron containing equipment varied from 15 to about 21 on the Hazen scale. Similarly, the opacity of the nickel dried chlorinated rubber varied from 0.38 to 0.68 on a scale according to which zero opacity represents crystal clarity, whereas the chlorinated rubber dried in the iron containing equipment had an opacity which varied from 1.2 to 4.5 on the same scale. The tendency to discolor upon exposure to light was much less for the nickel dried chlorinated rubber. Thirty per cent solutions of the nickel dried chlorinated rubber in toluene subjected to 16 hours' exposure to ultraviolet light from a mercury arc and examined 24 hours later had a final color from 10 to 12½ on the Gardner scale (equivalent to 80–150 on Hazen scale). Similarly treated solutions of the chlorinated rubber dried in the iron containing equipment had a color varying from 14.5 to 18 on the Gardner scale (equivalent to 225–500 on the Hazen scale).

This comparison in quality is typical of results obtained when comparing materials dried in contact with nickel surfaces and those dried in contact with various metals widely considered to be highly resistant to corrosion. For example, it has been found that chlorinated rubber dried in contact with nickel is similarly superior to chlorinated rubber dried in contact with such metals as Inconel (nickel 80%, chromium 14%, iron 6%); KA2S (18–8 type of chromium-nickel stainless steel, and KA2SMo (similar stainless steel containing 2 to 4% molybdenum). For example, comparing a series of lots of chlorinated rubber dried in nickel equipment with a series of chlorinated rubber lots dried in a KA2S drier, all other treatments being the same, the color values in 20% toluene solution for 8 lots of the nickel dried material varied from 9 to 12 on the Hazen scale, whereas the colors for KA2S dried material varied from 15 to 36. Likewise, the opacity in toluene solution was much less for the nickel dried material, being represented by a value of 2.7 as against 2.7 to 7.1 for the KA2S dried material.

Thus, it will be seen that chlorinated rubber dried in contact with substantially pure nickel surfaces is of enhanced quality with respect to both initial improvement in color and in clarity, and with respect to stability of color upon exposure as to ultraviolet light and freedom from other changes in comparison with chlorinated rubber dried in contact with such materials as iron, stainless steel, Inconel, etc.

The Gardner and Hazen color scales referred to herein are those described and compared in Gardner's "Physical and Chemical Examination of Paints, Varnishes, Lacquers and Colors," 1937 edition, especially page 182. Hazen standards below 10 are cobalt-platinum solution; above 10, caramel standards on the same scale (i. e., a color of 20 has twice the intensity of a color of 10, etc.) are used. The entire scale, cobalt-platinum and caramel solutions, is referred to as the Hazen color scale. The Gardner scale differs in being wholly empirical, the colors increasing greatly in intensity as the numbers increase.

It will be understood that the details and examples hereinbefore set forth are illustrative only and that the invention as broadly described and claimed is in no way limited thereby.

What I claim and desire to protect by Letters Patent is:

1. The improvement in the manufacture of chlorinated rubber which comprises drying water-wet precipitated chlorinated rubber in contact with surfaces consisting essentially of nickel, said nickel surfaces being maintained at a temperature between about 50° C. and about 130° C.

2. The improvement in the manufacture of chlorinated rubber which comprises drying water-wet precipitated chlorinated rubber in a container whose surfaces in contact with the chlorinated rubber being dried consist of substantially pure nickel, said nickel surfaces being maintained at a temperature between about 50° C. and about 130° C., under subatmospheric pressures until substantially all moisture has been eliminated from the chlorinated rubber.

EARL D. SMITH.